US011900008B2

(12) United States Patent
Krejci et al.

(10) Patent No.: US 11,900,008 B2
(45) Date of Patent: Feb. 13, 2024

(54) ADVANCED AUDIO PROCESSING SYSTEM

(71) Applicant: HARMAN INTERNATIONAL INDUSTRIES, INCORPORATED, Stamford, CT (US)

(72) Inventors: Philipp Maximilian Krejci, Ettlingen (DE); Kadagattur Gopinatha Srinidhi, Bangalore (IN); Darby Hadley, Birmingham, MI (US); Tobias Muench, Munich (DE)

(73) Assignee: Harman International Industries, Incorporated, Stamford, CT (US)

( * ) Notice: Subject to any disclaimer, the term of this patent is extended or adjusted under 35 U.S.C. 154(b) by 127 days.

(21) Appl. No.: 16/958,950

(22) PCT Filed: Dec. 31, 2018

(86) PCT No.: PCT/IB2018/060746
§ 371 (c)(1),
(2) Date: Jun. 29, 2020

(87) PCT Pub. No.: WO2019/130286
PCT Pub. Date: Jul. 4, 2019

(65) Prior Publication Data
US 2020/0341725 A1 Oct. 29, 2020

Related U.S. Application Data

(60) Provisional application No. 62/611,682, filed on Dec. 29, 2017.

(51) Int. Cl.
*G06F 3/048* (2013.01)
*G06F 3/16* (2006.01)
(Continued)

(52) U.S. Cl.
CPC ............ *G06F 3/165* (2013.01); *G06F 3/0482* (2013.01); *G06F 3/04847* (2013.01); *G11B 27/031* (2013.01)

(58) Field of Classification Search
CPC ..... G06F 3/165; G11B 27/031; G11B 27/038; H04H 60/04; G10H 2220/131; H04S 7/40
See application file for complete search history.

(56) References Cited

U.S. PATENT DOCUMENTS 6,490,359 B1 12/2002 Gibson
2006/0251260 A1* 11/2006 Kitayama ............... H04S 7/302
381/1

(Continued)

FOREIGN PATENT DOCUMENTS

CN 104285451 A 1/2015
CN 105898663 A 8/2016
(Continued)

OTHER PUBLICATIONS

Japanese Office Action for Application No. 2020-533059 filed Jun. 16, 2020, dated Dec. 27, 2022, 12 pgs.
(Continued)

*Primary Examiner* — Aleksey Olshannikov
(74) *Attorney, Agent, or Firm* — Brooks Kushman P.C.

(57) ABSTRACT

An audio processing system may include at least one memory configured to maintain a plurality of audio signal processing algorithms and audio components, and a server having a processor. The processor may be configured to present an interface displaying at least a portion of the signal processing algorithms and audio components, receive user selection of at least one of the audio components, present the at least one selected audio component via the interface, receive user selection of at least one of signal processing algorithms to apply to the at least one selected audio component, apply the at least one selected algorithm to the
(Continued)

at least one selected audio component, and provide a measurement of the at least one selected algorithm and the at least one selected audio component via the interface.

16 Claims, 16 Drawing Sheets

(51) Int. Cl.
   *G06F 3/0482*     (2013.01)
   *G06F 3/04847*    (2022.01)
   *G11B 27/031*     (2006.01)

(56) References Cited

U.S. PATENT DOCUMENTS

| | | |
|---|---|---|
| 2009/0234478 A1 | 9/2009 | Muto et al. |
| 2014/0254826 A1 | 9/2014 | Allen |
| 2015/0205569 A1 | 7/2015 | Sanders et al. |
| 2017/0269898 A1 | 9/2017 | Barrett |
| 2018/0286462 A1* | 10/2018 | Becherer ............... G06F 3/165 |

FOREIGN PATENT DOCUMENTS

| | | |
|---|---|---|
| JP | 2009218937 A | 9/2009 |
| JP | 2011505750 A | 2/2011 |
| JP | 2011199630 A | 10/2011 |
| JP | 2017188877 A | 10/2017 |
| WO | 2009073264 A1 | 6/2009 |

OTHER PUBLICATIONS

Final Office Action for Japanese Application No. 2020-533059 filed Jun. 16, 2020, dated Jun. 30, 2023, 12 pgs.
European Office Action for Application No. 18845416.9 filed Jun. 24, 2020, dated Oct. 23, 2023, 7 pgs.
First Chinese Office Action dated Dec. 1, 2023 for Chinese Application No. 201880084738.7 filed Jun. 29, 2020, 15 pgs.

* cited by examiner

ADVANCED AUDIO PROCESSING SYSTEM

CROSS-REFERENCE TO RELATED APPLICATIONS

This application is the U.S. National Phase of PCT/IB2018/060746 filed Dec. 31, 2017, which claims the benefit of U.S. provisional application Ser. No. 62/611,682 filed Dec. 29, 2017, the disclosures of which are hereby incorporated in their entirety by reference herein.

TECHNICAL FIELD

Disclosed herein are advanced audio processing systems.

BACKGROUND

Audio product development may include various applications of signal processing, setting allocations, parameters, etc., to be applied to new and existing products. With a rising number and degree of diversification in products including audio components, manufacturers are up against shortening product life cycles, increasing costs, consumer demands for enriching experience, among other constraints.

SUMMARY

An audio processing system may include at least one memory configured to maintain a plurality of audio signal processing algorithms and audio components, and a server having a processor. The processor may be configured to present an interface displaying at least a portion of the signal processing algorithms and audio components, receive user selection of at least one of the audio components, present the at least one selected audio component via the interface, receive user selection of at least one of signal processing algorithms to apply to the at least one selected audio component, apply the at least one selected algorithm to the at least one selected audio component, and provide a measurement of the at least one selected algorithm and the at least one selected audio component via the interface.

A method for an audio processing system may include presenting an interface displaying a plurality of signal processing algorithms and audio components, receiving user selection of at least one of the audio components, presenting the at least one selected audio component via the interface, receiving user selection of at least one of signal processing algorithms to apply to the at least one selected audio component, applying the at least one selected algorithm to the at least one selected audio component, and providing a measurement of the at least one selected algorithm and the at least one selected audio component via the interface.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Manufactures of audio components aim to achieve the best possible audio and active noise management solutions for a given architectural framework, with the ability to scale into multiple platforms. However, due to the demands on product development, a streamlined audio development and design process is beneficial.

Disclosed herein is an enhanced system for both business-to-business and business-to-consumer use, allowing a single audio framework to be used globally across platforms and projects to provide a single workflow and structure for audio feature development and usages. The audio processing system allows for the capability and flexibility to seamlessly use audio objects and tuning strategies to offer premium sound for various system levels, from entry level to high complexity systems, without necessitating a hardware upgrade. The systems push updates over-the-air and provide a pay-as-you-go monetization. The system allows for an easily customizable audio product build mechanism that permits a designer to pick and choose products, apply various parameters and processing to those products, and analyze the build to facilitate a seamless optimization for product development.

The system provides a graphical Signal Flow Designer that enables system engineers to configure, tune, and measure their complex signal and data flows in one place. The system is device independent and comes with a virtual amplifier for simulation and rapid prototyping. The system is designed to work on a single processor, digital signal processor (DSP) or one or more cores of a SoC. The system is designed to work on multiple devices simultaneously (e.g. signal flows on a head unit and amplifier(s) can all be configured and tuned through one instance of the system)

Figure 1:
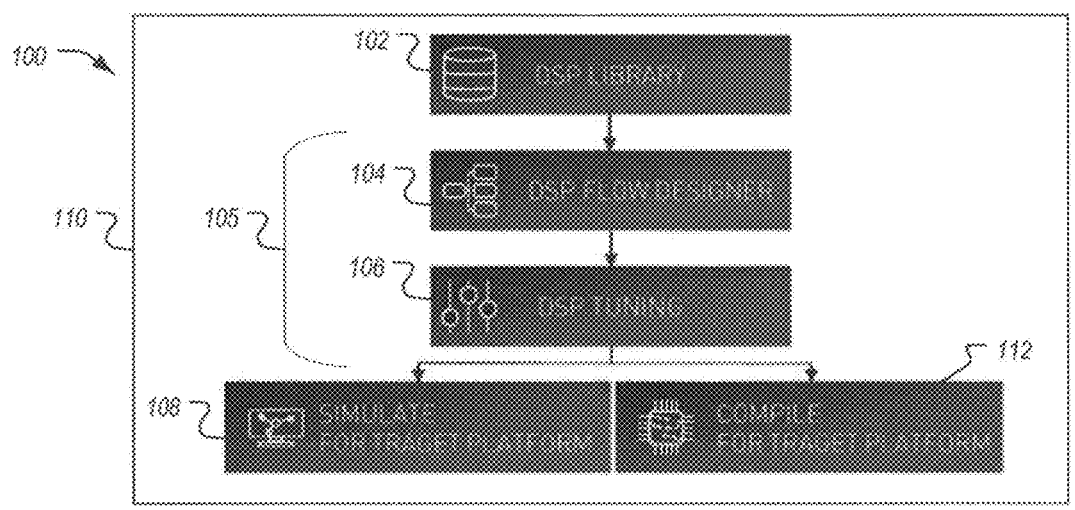
FIG. 1 illustrates a block diagram of an audio processing system according to one embodiment.

The system provides a host-server application (AmpSrv2) for communication with the virtual or target device with support for multiple physical interfaces. The system is designed to support full customization of tuning panels by the usage of custom panels, native panels, and a hybrid of both panel types. The system has a proprietary tuning protocol (xTP) for an efficient bi-directional communication with the virtual- or target device. The system provides a measurement module which is designed to enable a direct communication to the target device for simple and efficient automation of a various range of audio measurement routines. The system provides a linking mechanism for state variables with intuitive UX/UI concept FIG. 1 illustrates a block diagram of an audio processing system 100. The system 100 may include a processor 110 including a DSP library or DSP database 102, a global tuning tool (GTT) 105 including a DSP flow designer 104 and a DSP tuning block 106, a simulation block 108, and a compile block 112. The processor 110 may be general purpose processor, a digital signal processor (DSP), etc. the processor 110 may be local to the system 100 or remote therefrom. The processor 110 may include a controller (not shown). The controller may be generally coupled to memory for operation of instructions to execute equations and methods described herein. In general, the controller is programmed to execute the various methods as noted herein.

The DSP database 102 may include a library of available tuning algorithms, digital signal processing applications and libraries, device libraries, etc. The database 102 may include a memory separate or shared by the controller.

The database 102 may include an Audio Algorithm Toolbox (AAT) consisting of hundreds of components of standardized audio algorithms. The database 102 may include an extendable Audio Framework (xAF) consisting of standardized DSP framework, rapid design, quick porting on diverse hardware, with a high degree of flexibility and efficiency on the market. The database 102 may also include the GTT 105 to configure the audio algorithm database and DSP framework and tune and control various algorithms. Additionally or alternatively, the GTT 105 may be separate from the database, as shown in the Example of FIG. 1.

The audio processing system 100 allows for a comprehensive audio development solution that is quickly adaptable to any hardware having audio processing capabilities. Standardized audio objects and integration of third party object can be easily included and combined with current products. The system 100 provides for a simulation environment on standardized PC architecture that enables rapid prototyping cluing benchmarking and performance evaluation. The system 100 ensures quality, efficiency, and better time to market, throughout development.

The DSP database 102 maintains the most current and effective signal processing algorithms for easy application across multiple business units. The database 102 catalogs hundreds of audio algorithms form all business units and development teams. The database 102 allows for a broad spectrum of categories of products and settings. This system 100 allows for a plug-and-play type of application so that algorithms may be easily dropped, applied, and tuned for a wide range of products across multiple industries. The system 100 may be easily adaptable via a laptop, PC, or tablet on several hardware platforms.

The system 100 may provide various user interfaces that are standardized for ease of use. The system 100 may allow for comprehensive tests during set up, analytics, and provide in depth documentation during the design process.

The DSP signal flow designer 104 may allow for various audio signalling processes to be selected via the user interface. Fundamental algorithms, including filters of many types (infinite impulse response (IIR), finite impulse response (FIR), tone controls, equalizations (EQ), etc.), mixers, volume, mute, routers, mergers, splitters, convolvers, resamples, fast Fourier transforms (FFTs), for example, may all be included and applied in the flow designer 104. Advanced processing may also be applied and may include examples such as compressors, limiters, gates, expanders, ACGs, speaker protection, thermal protection. User selectable signal generators, modulators and synthesizers may also be included. Noise, echo and feedback controllers may be impended as wells as signal analyzers, microphone, voice and communication processing. Reverbs and effects may also be applied. Individual sounds zones and virtual venues may also be applied.

The DSP tuning block 106 may allow for customizable tuning of the various products and algorithms selecting via the flow designer 104. This may be accomplished via the screens presented at the human machine interface (HMI) described herein.

Figure 2:
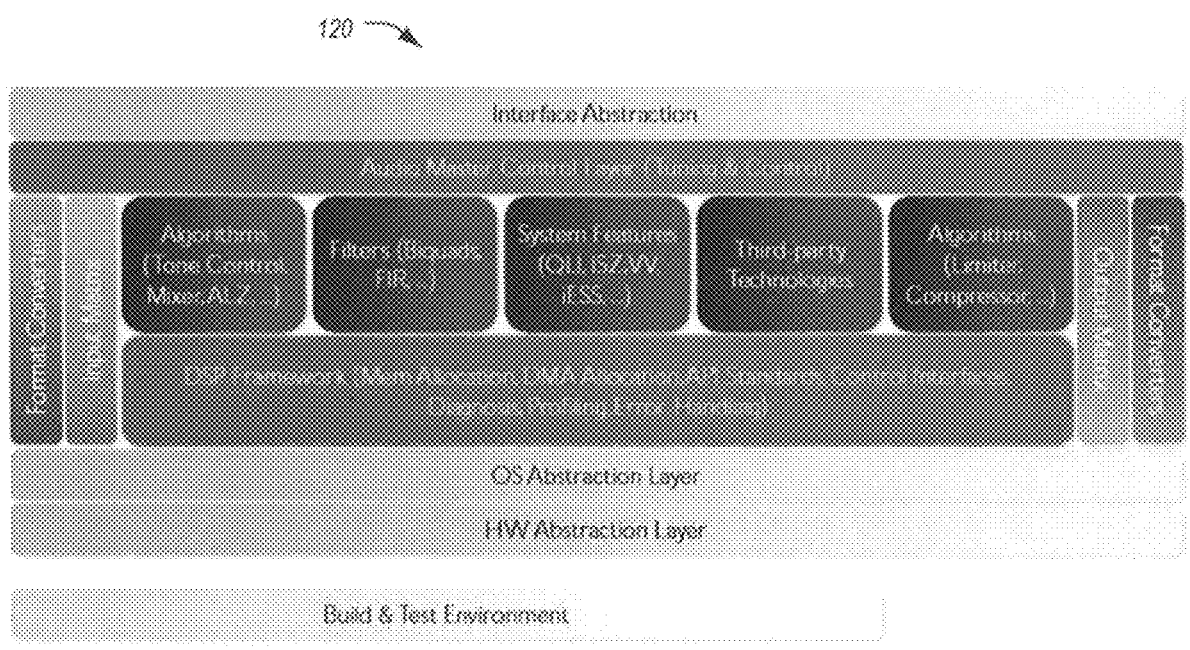
FIG. 2 illustrates an example extendable Audio Framework (xAF)

As mentioned above, the database 102 may include an extendable Audio Framework (xAF). FIG. 2 illustrates an example xAF framework 120. The framework 120 may be modular, scalable, configurable and portable, enabling state of the art development processes.

The framework 120 may include a DSP framework including basic audio objects such as volume, biquads, limiters, etc. This framework 120 is portable across processors and platforms including multi-core SoCs. Due to the hardware and operating system abstraction layers, the framework 120 has a high efficiency. The framework 120 supports a virtual amplifier approach to simulate amplifiers on PC in real-time. The virtual amplifier may allow for virtual studio technology (VST) and may allow an external third party VST host or an embedded VST host insides of the system 100 to enable direct debugging of the VST. The graphical designer within the framework allows for flexible audio path definition. The framework 120 is compatible with other GTT and AAT and supports third party algorithms. The system 100 may work on a single DSP as well as multiple cores of system-on-chip (SoC). The GTT 105 may allow the creation of new devices and selected cores for the new device. This is illustrated by way of example in FIG. 6I.

Figure 3:
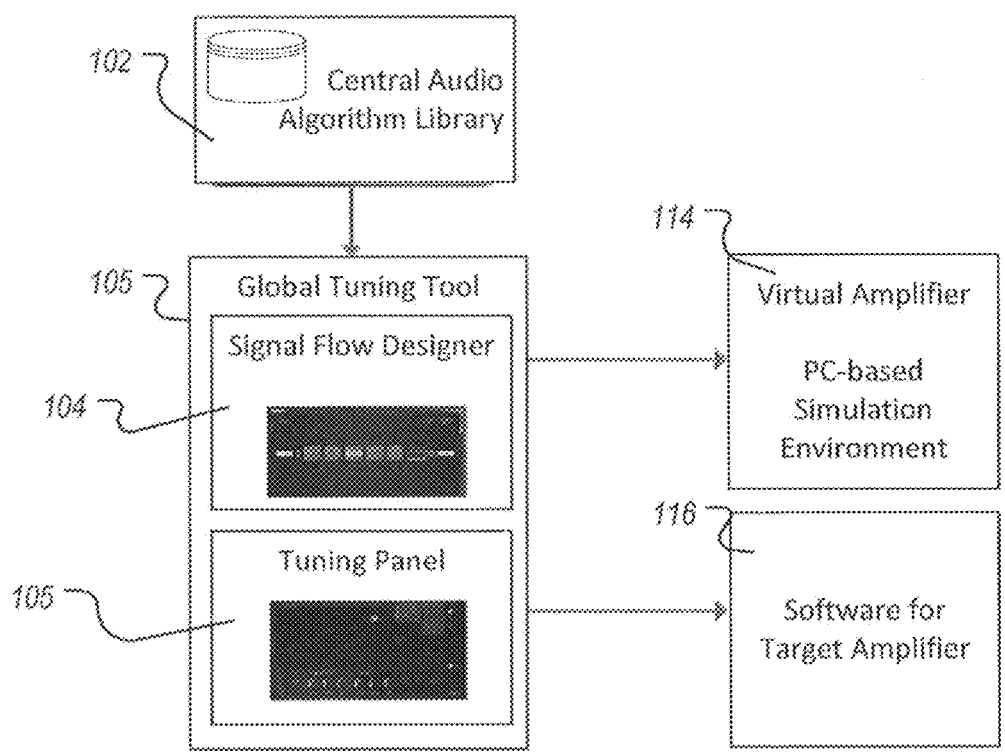
FIG. 3 illustrates an example design flow for the xAF.

FIG. 3 illustrates an example design flow for the xAF framework 120. First, the DSP database 102 is generated. As explained, the DSP database 102 is a comprehensive and standardized algorithm library is created and stored centrally. A signal flow may be dynamically changed by applying various algorithms, etc. The GTT 105 may read out the algorithm library so that the user may create a DSP project in the signal flow designer 104 via the user interface. The DSP tuning block 106 of the GTT 105 may allow for customizable tuning of the various products and algorithms selecting via the flow designer 104.

The GTT 105 may create a database file to create a virtual amp as a plugin optimized for PC and to be compiled with source code and flashed to a target amplifier 116. The GTT 105 may then read out the database file from the virtual amplifier 114 or the target amplifier 116 to be configured. The GTT 105 may control the virtual amplifier and/or target amplifier to simulate amplifiers on the PC in real-time.

Figure 4:
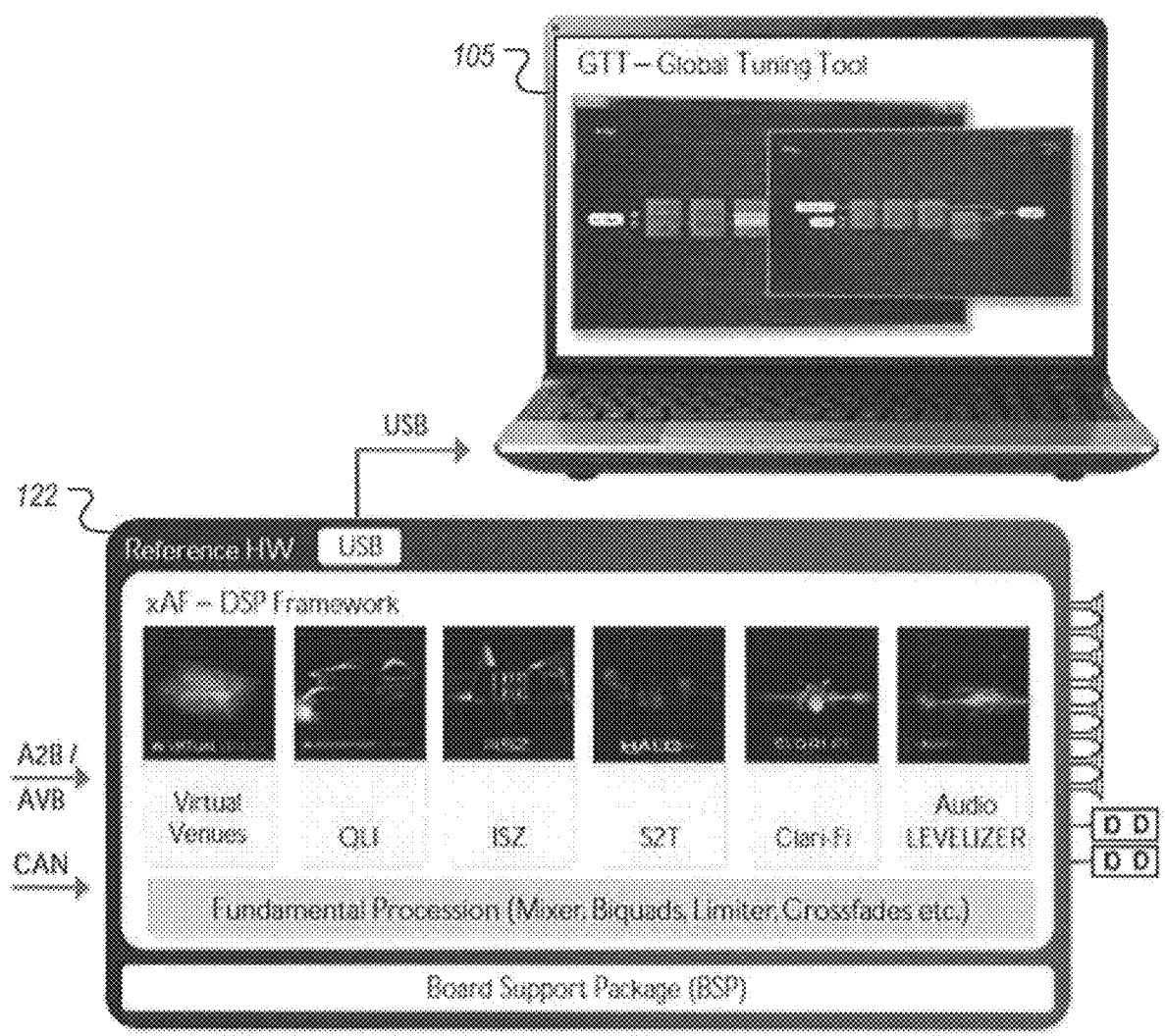
FIG. 4 illustrates an example development kit integration.

FIG. 4 illustrates an example development kit integration for the GTT 105. The GTT 105 may establish a DSP framework 122. The DSP framework 122 may be part of the CoC SW reference SDK (RSDK) and is integrated periodically with a reference hardware, the GTT 105, and the more important of the audio algorithms. The DSP framework 122 contains minimum mandatory objects to establish a basic signal flow for the flow designer 104. The DSP framework 122 may incorporated and call to various technologies such as ISZ, Virtual Venues, Clari-Fi, Audio Levelizer, Sound2Target, etc. These technologies may be ported to the DSP framework 122 to guarantee a smooth integration and high quality. The RSDK ensures high quality integration, test, and documentation of the entire package. The DSP framework 122 may include virtual venues.

Figure 5A:
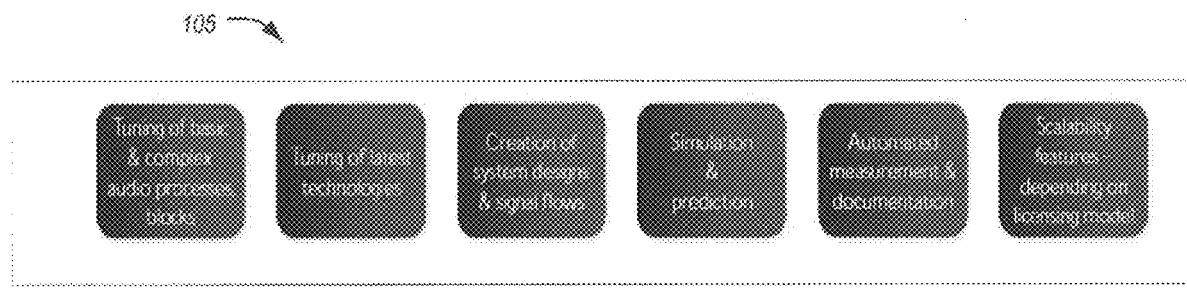
FIGS. 5A and 5B illustrate block diagrams of various aspects of the global tuning tool (GTT)
Figure 5B:

FIGS. 5A and 5B illustrate block diagrams of various aspects of the global tuning tool (GTT) 105. The GTT 105 includes a comprehensive audio and tuning tool suite. Various measurement, tuning and simulations of audio and acoustic experts are bundled in the GTT 105 to create a unique flexibility for customization from simple to complex system designs. The GTT 105 supports real and complete virtual tuning. Tuning efficiency and quality is increased due to the easy to use user interface or HMI and data handling. One comprehensive tool is used for several applications such as audio and HALOsonic/NVH tuning applications.

With the increasing variety of audio development tools, it may be difficult to realize a constant overview of the existing audio algorithms and to find the right solution for each product. Customers may wish to find the perfect solution and combination for their product in an efficient and intuitive way. The GTT 105 consolidates the best tools by bundling the knowledge and user experiences all in one place. The framework may include tailored architecture to cover current and future needs for a wide range of audio applications and technologies from automotive, luxury audio and consumer. The GTT 105 may extend and add new functionality and create links between various applications.

Figure 6A:
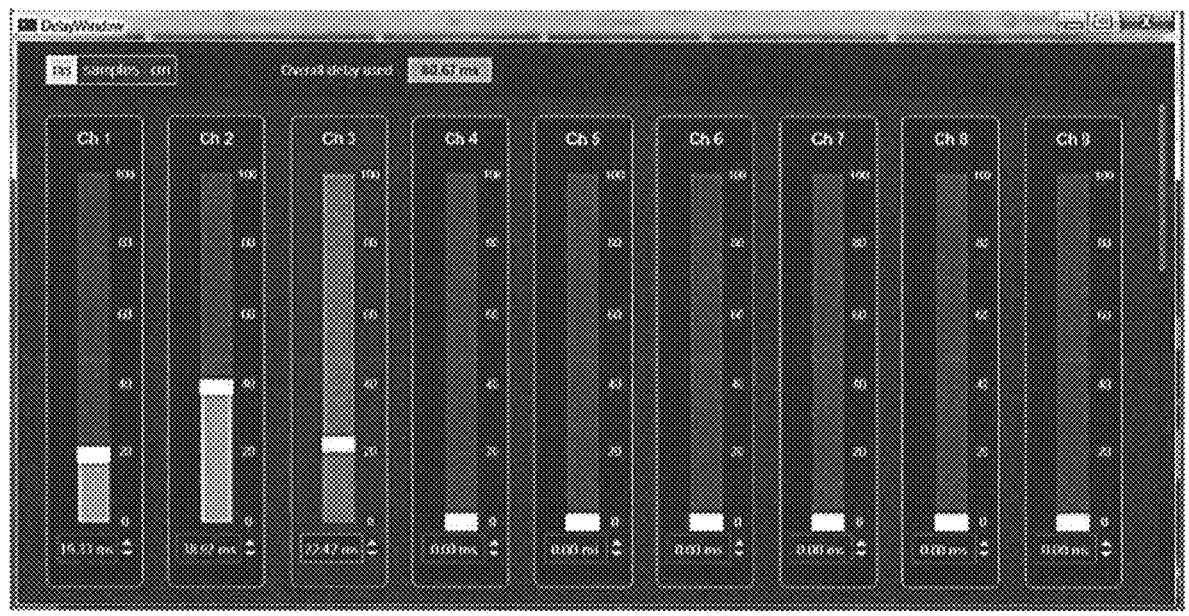
FIG. 6A illustrates an example audio panel of the GTT.

FIG. 6A illustrates an example audio panel 602 of the GTT 105. The user interface may be linked to properties of processing blocks and supports profiling. The delay of each channel may be adjusted. The overall delay may be dynamically updated and displayed accordingly.

Figure 6B:
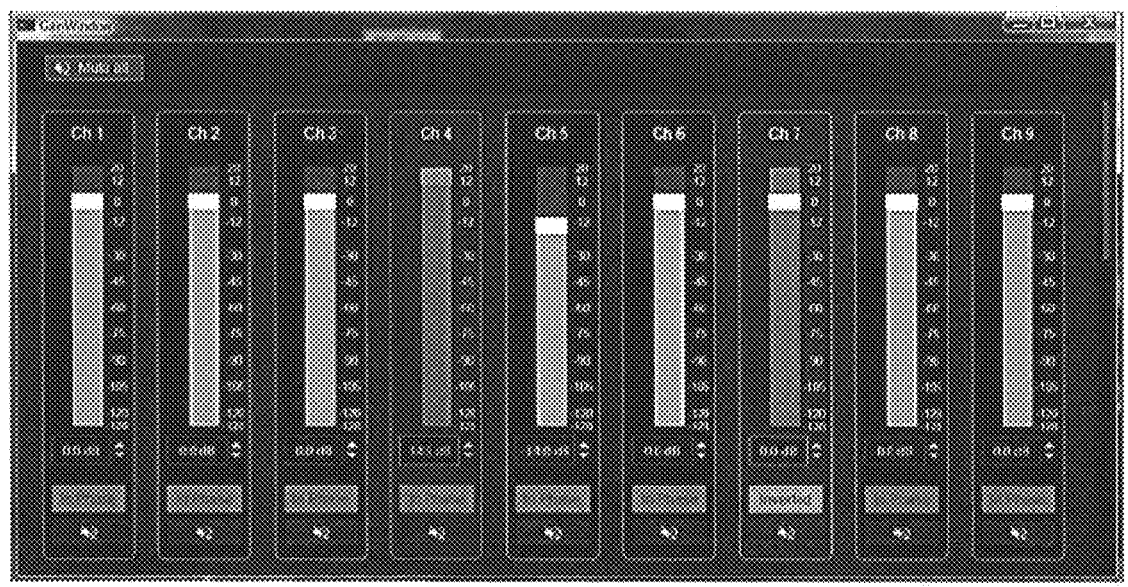
FIG. 6B illustrates another example audio panel of the GTT.

FIG. 6B illustrates another example audio panel 604 of the GTT. The user interface may present critical settings for each channel. The properties of each channel may be adjusted, including the gain, inversion, mute, etc.

Figure 6C:
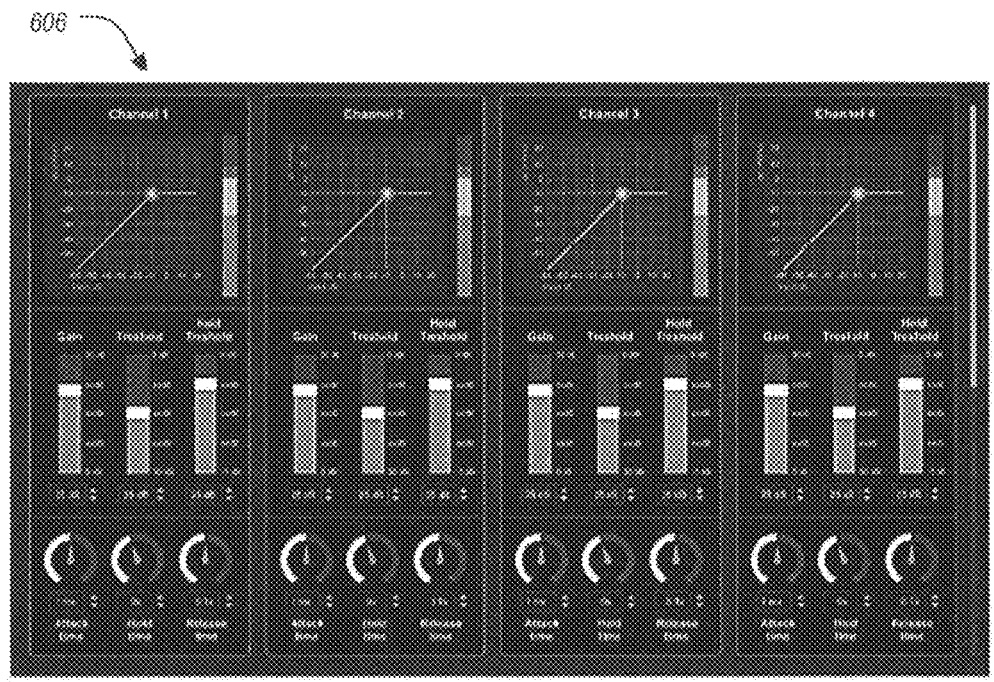
FIG. 6C illustrates another example audio panel of the GTT.

FIG. 6C illustrates another example audio panel 606 of the GTT. The user interface may allow for easy monitoring and data streaming form the amplifier, as well as enable easy data analysis. The properties of each channel may be easily visible and adjusted, including the gain, threshold, hold threshold, attach, hold and release times, etc.

Figure 6D:
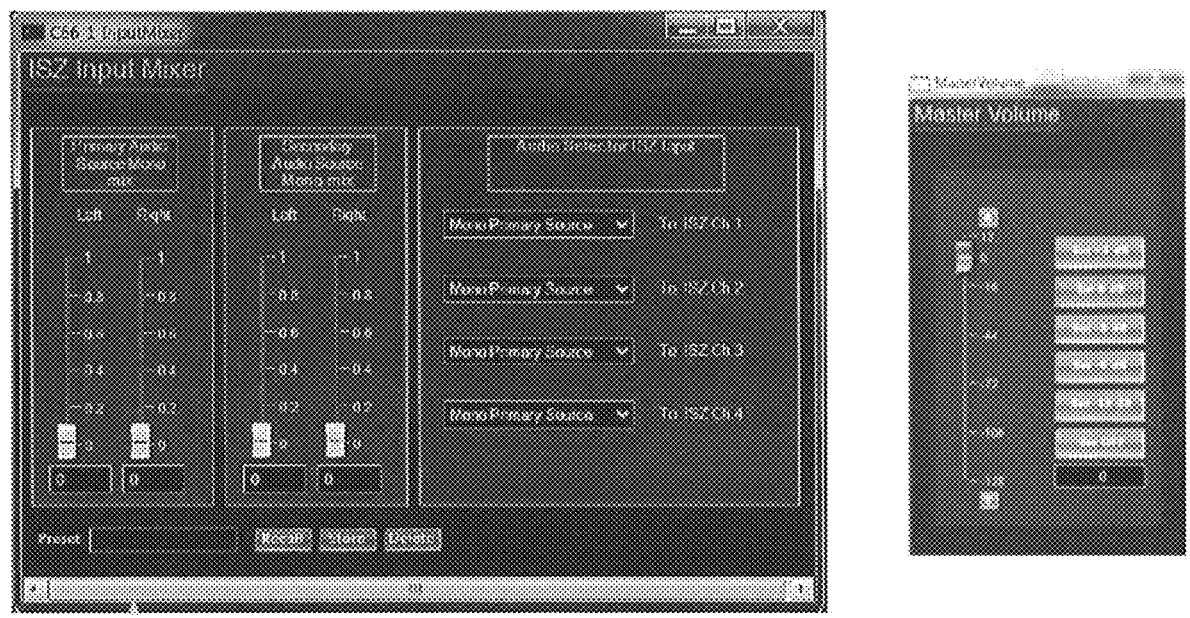
FIG. 6D illustrates another custom audio panel of the GTT.

FIG. 6D illustrates another example audio panel 608 of the GTT 105. The user interface may present a combination of native and fully customized panels made available via the ISZ input mixer. This mixer may allow for a primary audio source and a secondary audio source to each be adjusted at the left and right channels. Presets may be applied to the mixer, and sources for each channel may be selected. Presets may be recalled, saved/stored, and deleted.

Figure 6E:
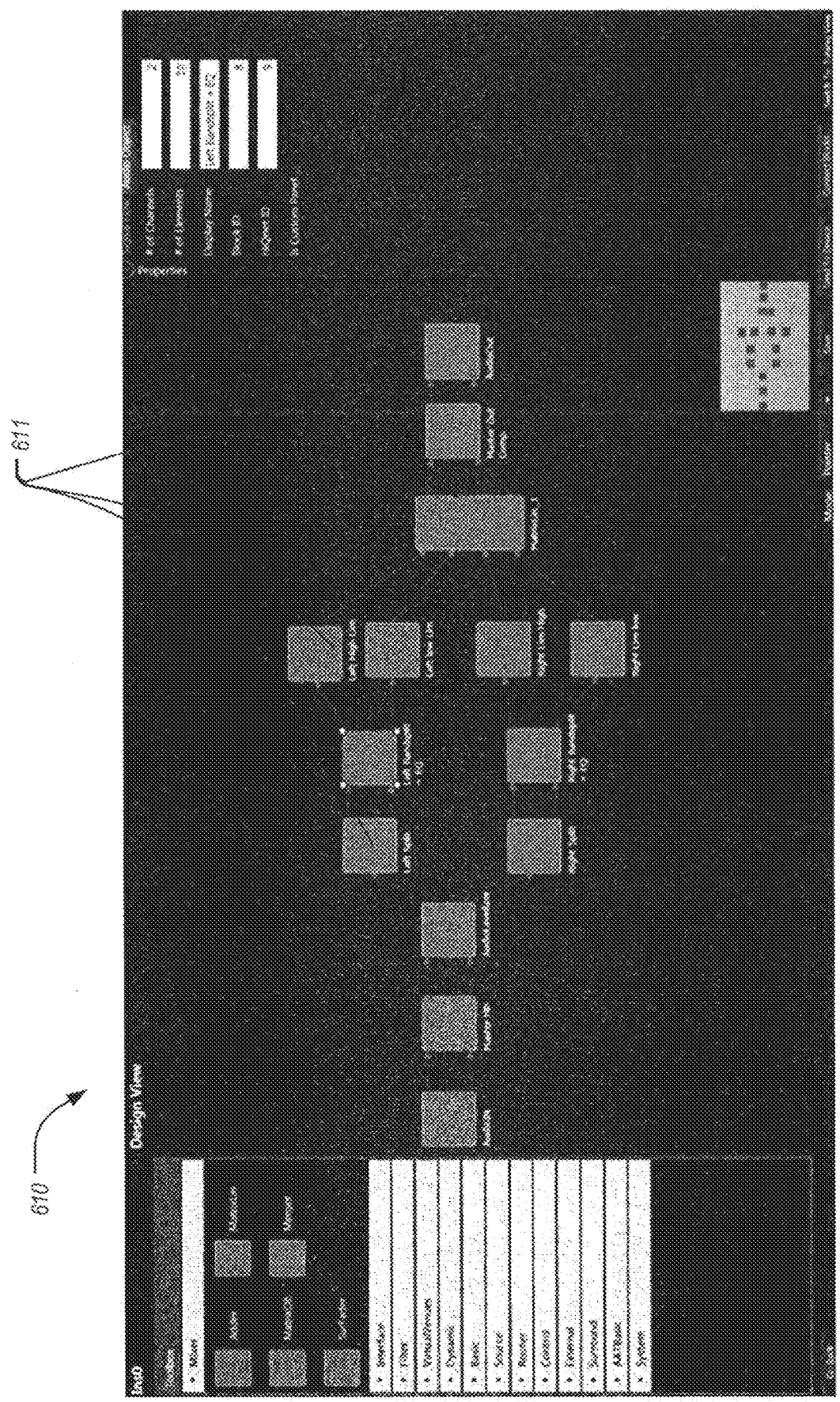
FIG. 6E illustrates an example signal flow design panel of the GTT.

FIG. 6E illustrates an example design panel 610 of the GTT 105 for the signal flow designer 104. The signal flow designer 104 enables the creation of simple and complex single flows including various blocks 611. Audio components/blocks 611 from the DSP database 102 may be added to the flow by way of drag and drop functionality. The blocks 611 may represent audio components such as amplifiers, speakers, filters, audio levelizer, band splits, matrices, etc. The framework may be aesthetically arranged so as to allow the user to easily see the flow design.

Although not shown, a similar view may be displayed for a tuning view. The user may switch from a design view to a tuning view. The panels to control the tuning parameters may be automatically populated based on the adjusted properties. The audio pipeline configuration may also be sent to the amplifier via the extended tuning protocol. A specific object represented by the blocks 611 may be selected by clicking or touching the block 611. A screen relating to the selected object may be presented in response to the selection. An example of such screen is illustrated in FIG. 6H.

Figure 6G:
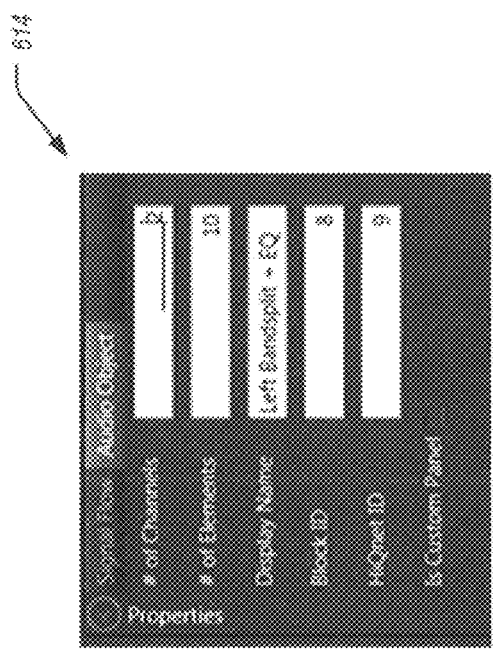
FIG. 6G illustrates an example property panel of the system.
Figure 6F:
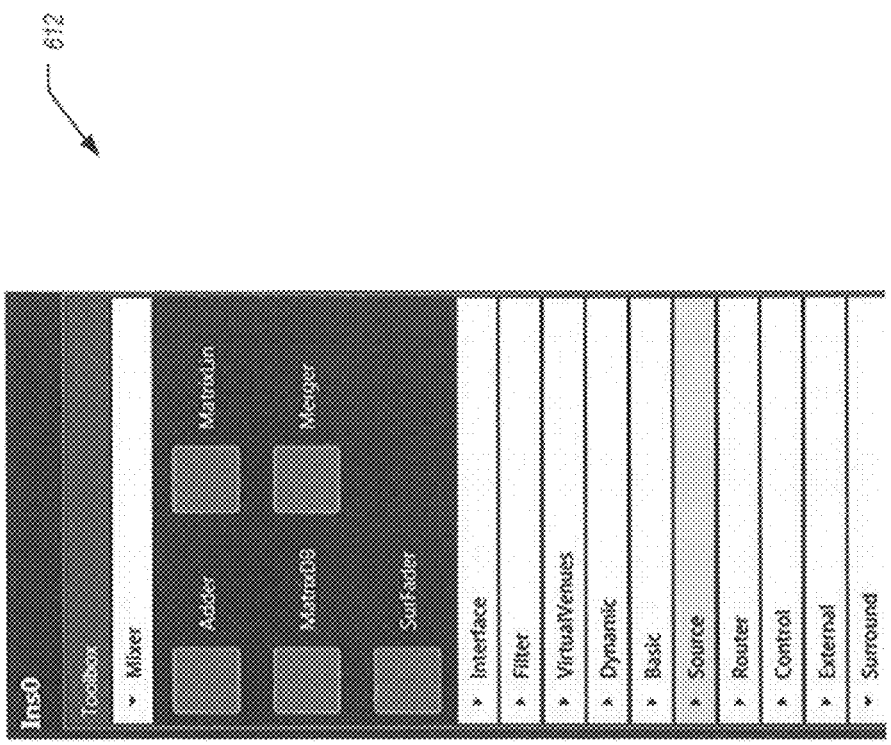
FIG. 6F illustrates an example database panel of the system having an algorithm tool box.

FIG. 6F illustrates an example database panel 612 of the system 100. The DSP database 102 may include various algorithms. Depending on the target device or amplifier, audio processing in the form of the algorithms stored within the database 105 may be pre-selected and pre-filtered. Whether such algorithms are automatically applied to the target device may depend on licensing and availability of the audio objects.

FIG. 6G illustrates an example property panel 614 of the system 100. The properties of each audio object may be adjusted and customized for different use cases of the target device. In this example illustrated in FIG. 6G, the object is configured with 2 channels and 10 elements or biquads. A signal audio object may have different configuration modes which may be adjusted in the SFD as well.

Figure 6H:
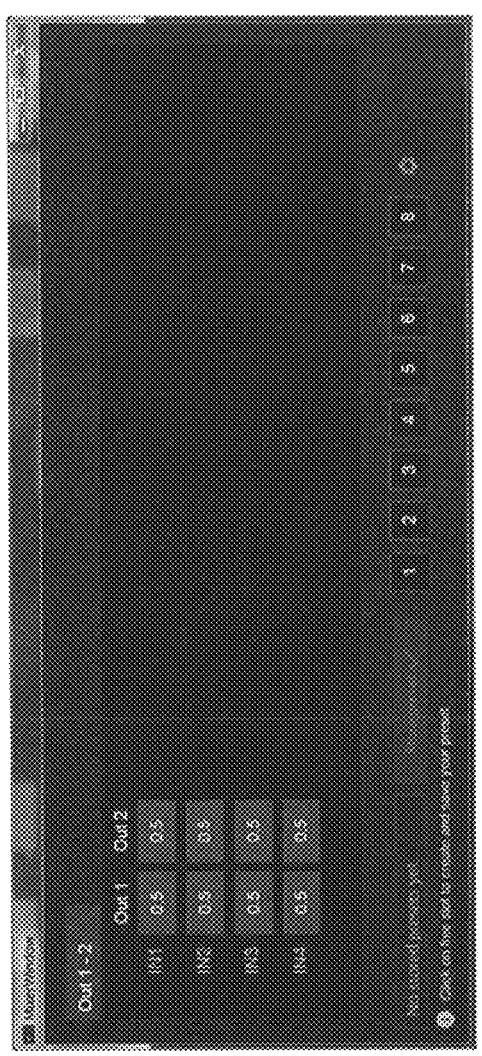
FIG. 6H illustrates an example native panel for a selected object.

FIG. 6H illustrates an example native panel 616 for a selected object. In addition to tuning, the panels 611 may also be created with an extended design functionality. Although not specifically shown, the system 100 may also include probe points in any position of the audio pipeline. The probe points may allow the processor 110 to analyze the processed signals between various audio objects. This may be managed via streaming and monitoring commands which are part of the xTP tuning protocol.

Figure 6I:
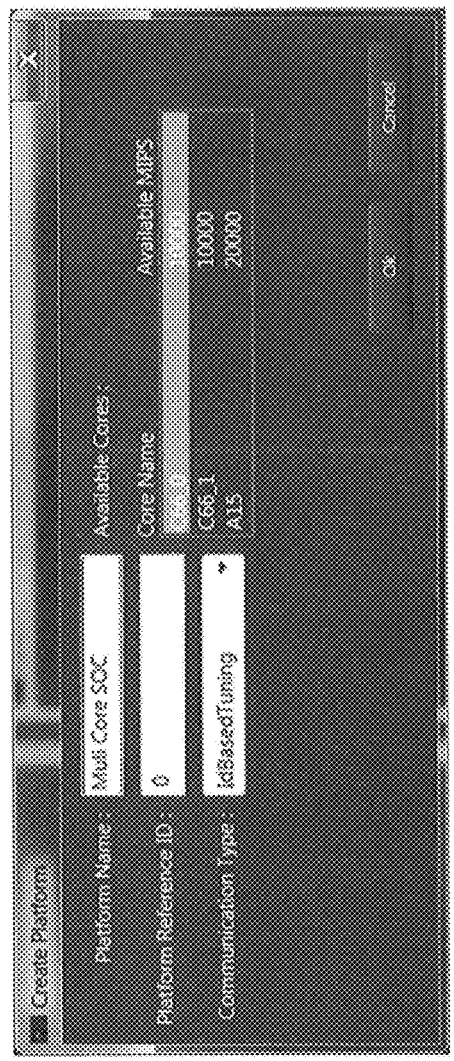
FIG. 6I illustrates an example system-on-chip (SoC) panel.

FIG. 6I illustrates an example SoC panel 618. The GTT 105 may allow the creation of new devices and selected cores for the new device. The example illustrated herein shows a basic configuration for a multi-core SoC.

Figure 6J:
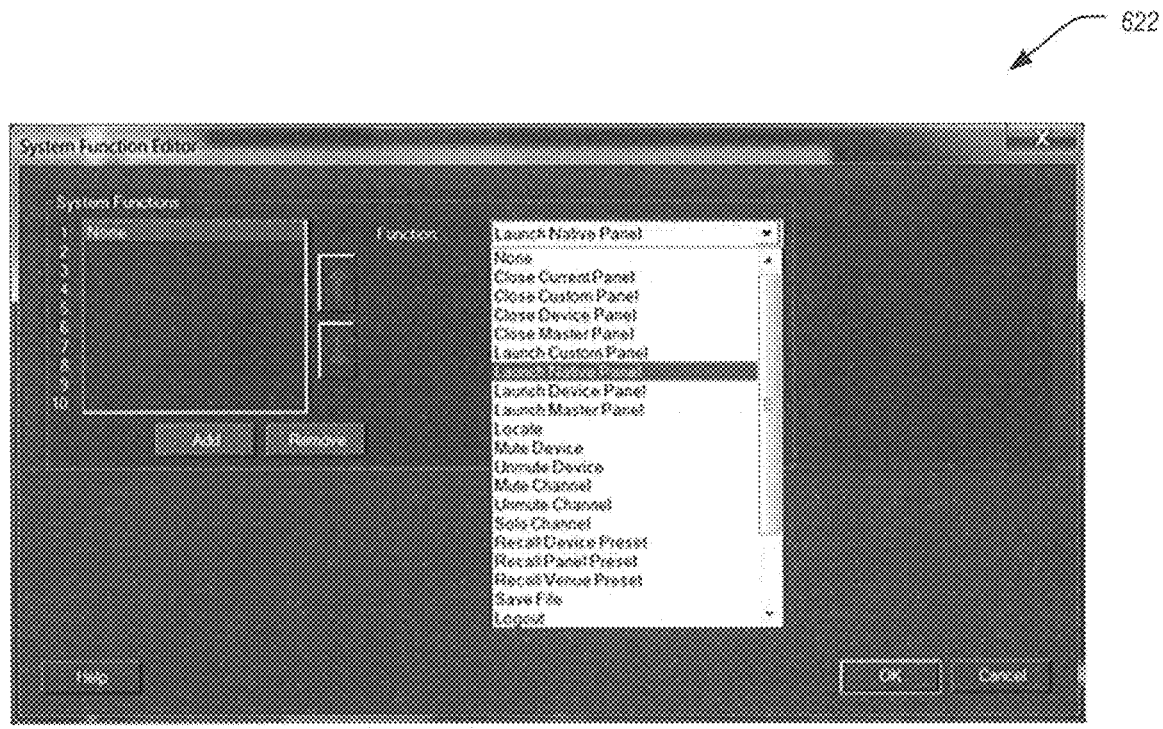
FIG. 6J illustrates an example system function editing panel.

FIG. 6J illustrates an example system function editing panel 622 for creating the custom panel of FIG. 6J. In response to the user selecting to "launch native panel", the user may create a custom panel.

Figure 6K:
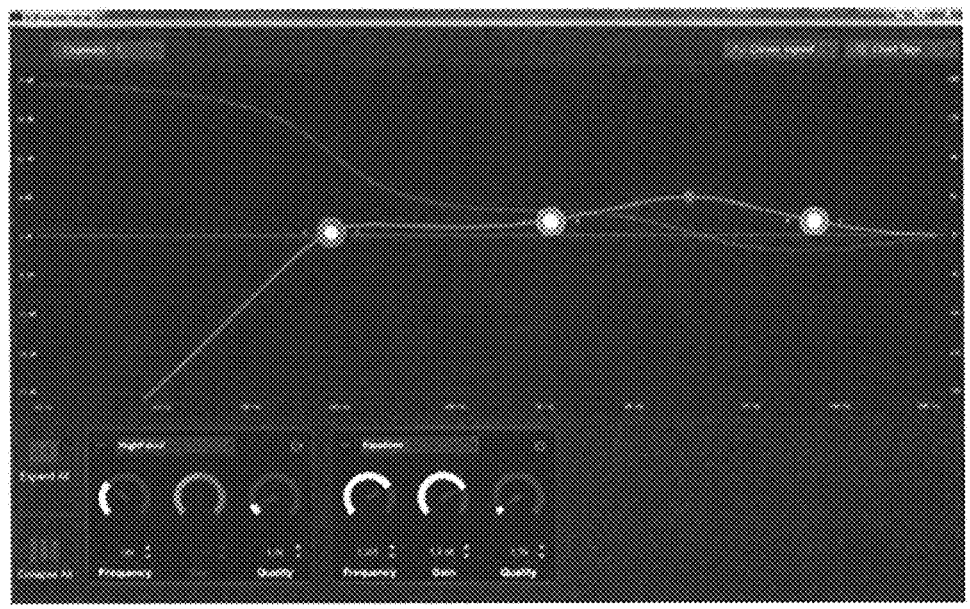
FIG. 6K illustrates example native panel created in response to the editing panel.

FIG. 6K illustrates an example native panel 624 created in response to the editing panel 622. This example native panel 624 may be programmed based on new UX/UI styling and customer and user requirements, but is native to the GTT 105.

Panels may be created that are a hybrid of both native and custom panels. The panel may include native features that have been customized to the user/customer requirements.

It should be noted that FIGS. 6A-6K are example user interfaces, and the system may include various other user interfaces with which the user may build an audio object.

Figure 7:
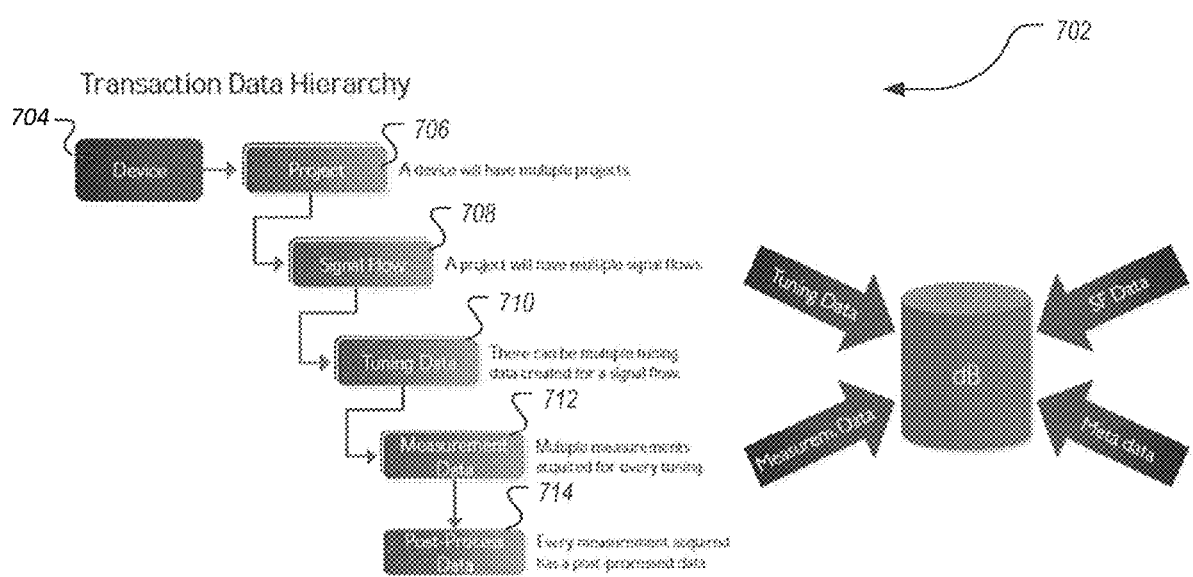
FIG. 7 illustrates an example transaction process for the GTT.

FIG. 7 illustrates an example transaction process 702 for the GTT 105. The integrated DSP database 102 allows for easy and secure data handling. The transaction process 702 may begin at block 704, where the processor 110 receives a device selection. The device selection may include selection of the target device to be programmed/simulated. For example, the target device may include an amplifier, speaker, microphone, etc. The target device may have specific applications such as a speaker for home audio, a speaker for vehicle audio, professional audio, as well as smart phones, tablets, personal computers, etc.

At block 706, the processor 110 may receive selection of a project. The project may be the selection of a programming of a target device.

At block 708, the processor 110 may receive selection of a signal flow. This may be established by the flow designer 104 based on various user inputs at the HMI. Further, a project may have multiple signal flows.

At block 710, the processor 110 may receive tuning data. This may be established as part of the tuning block 106 of the GTT 105.

At block 712, the processor 110 may, for each tuning, process various measurements and store measurement data. This measurement data may be used by the user to make adjustments to the tuning, devices, algorithms used, etc. The measurement data may be directly communicated to the target device for simple and efficient automation of various range of audio measurement routines. The measurement data may be accessed on the same PC or via the network. The connection may be made via Asio or MME sound card, among others.

At block 714, the processor 110 may store and/or display post-measurement data as it relates to the device and applied algorithms. This may include outputting an output signal based on an input signal after simulating the framework and based on the measurement data.

Figure 8:
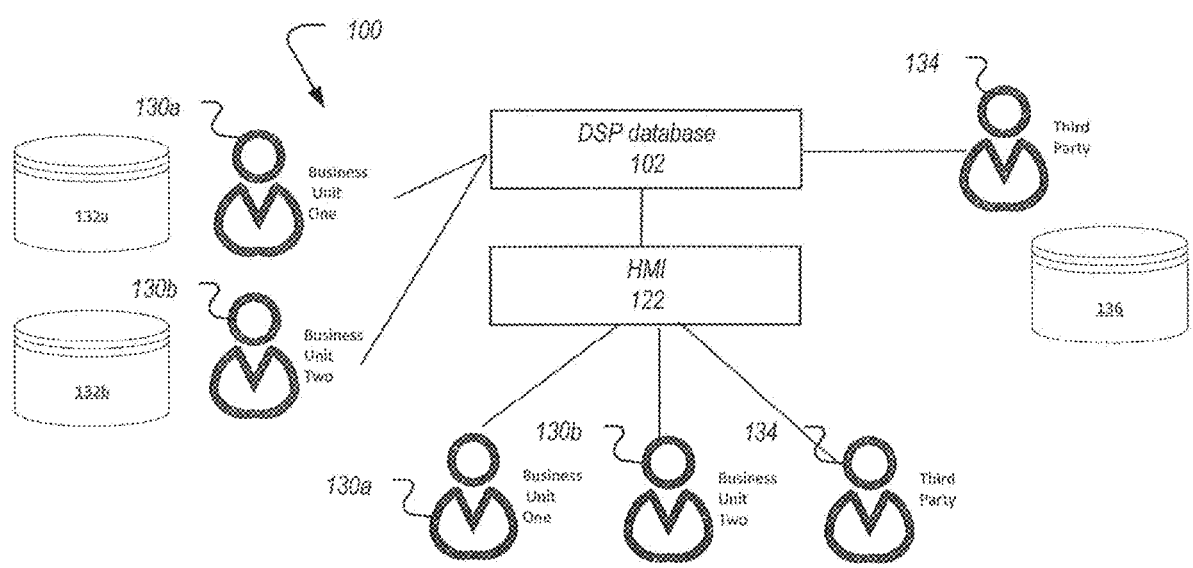
FIG. 8 illustrates an example block diagram of the overall system.

FIG. 8 illustrates and example block diagram of the overall system 100. The system 100 may include at least one business unit 130. In the example shown in FIG. 8, a first business unit 130a and a second business unit 130b are illustrated. Each business unit 130 may access and utilize the system 100. One or more of the business units 130 may be associated with a business database 132, similar to the DSP database 102 of FIG. 1. For example, the first business unit 130a may be associated with a first business database 132a, and the second business unit 130b may be associated with a second business database 132b. The business units 130 may provide various DSP algorithms to the system. These databases 102 may be added to the DSP database 102. Additionally or alternatively, third party products and algorithms may also be provided to the DSP database 102.

By allowing the business databases 132 to upload to the DSP database 102, the DSP database 102 may be continually updated to include the latest versions of various algorithms. The system 100 including the xAF, the AAT, and the GTT, may access the DSP database 102 to facilitate building of various products using the algorithms and products stored in the database 102.

Various third parties 134 may, in addition to the business units 130, have access to the DSP database. The third party 134 may receive algorithms from the DSP database 102 and save the algorithm to its local third party database 136. In some examples, the third party 134 may also upload to the DSP database 102.

The various business units 130, as well as the third parties 134, may, via the HMI 122, pull, apply and tune, the various algorithms and products. The HMI 122 may provide for an easy to use tool and the system 100 and database 102 may allow for a library of easily configurable and updatable products to be used to build various audio products. The HMI 122 may present screens similar to those illustrated and described herein.

The business units 130 and third parties 134 may be authenticated prior to using the system 100. The authentication may be granted in response to verification of the user. Verification of the user may depend on a subscription to the system 100. The verification may depend on the third-party contractual relationship or business unit. For example, some third party supplier may have different access levels than others.

Figure 9:
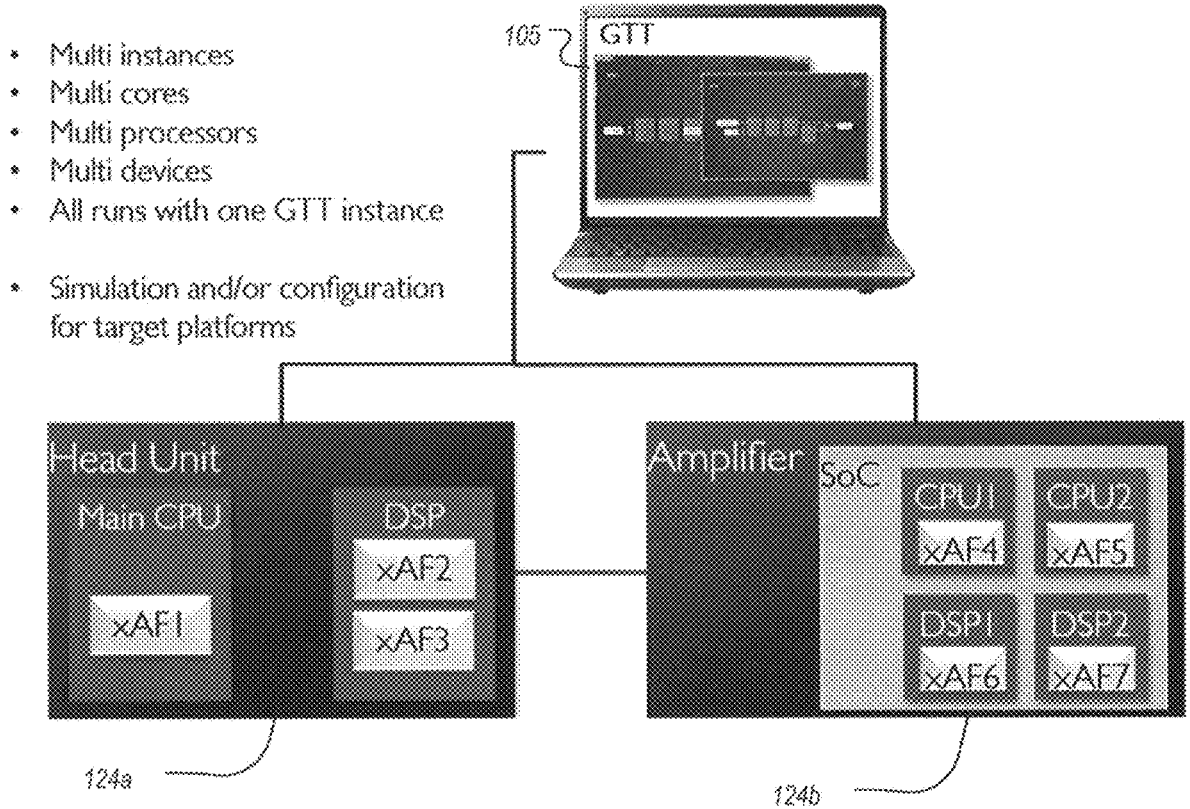
FIG. 9 illustrates an example configuration of the GTT where multiple devices are configured simultaneously.

FIG. 9 illustrates an example configuration of the GTT 105 where multiple devices are configured simultaneously. The devices may be configured and tuned all at once. A first device 124a may be a head unit. A second device 124b may be an amplifier with a SoC. The devices 124 may also be amplifiers used in multiple room configurations, either in consumer or professional audio applications. The devices 124 also may be tables, phones, laptops or PCs. The system 110 via the processor 110 may tune and calibrate both devices 124. The system 100 may handle multiple cores, processors, devices, etc. The processor 110 may simulate various output signals based on the objects 611 and parameters applied thereto. The communication to each device 124 may be enabled through AmpSrv2 application. Each device 124 may be handled as a new client. The GTT 105 may facilitate adjustments to the tuning and flow parameters.

The AmpSrv2 application may allow for communication between virtual and target devices supported by multiple physical interfaces. Data may be sent and received via globally standardized and agreed upon protocols. In one example, the protocol may be xTP (extended Tuning Protocol). This may enable flashing data into the device and reading out metadata from the audio framework. The AmpSrv2 application may support various interfaces such as RS232, MOST, CAN, Ethernet (socket), Ethernet (UDP messages). The application may display, analyze and record the ongoing communication to the connected device. The programs and data may be updated. Simulation of the head unit and other vehicle data may include volume, bass, treble, fader, as well as vehicle data such as speed, throttle position, rpm., etc. The application may also perform a diagnosis function including loudspeaker checks, read error logs, calibration of microphones, etc.

Figure 10:
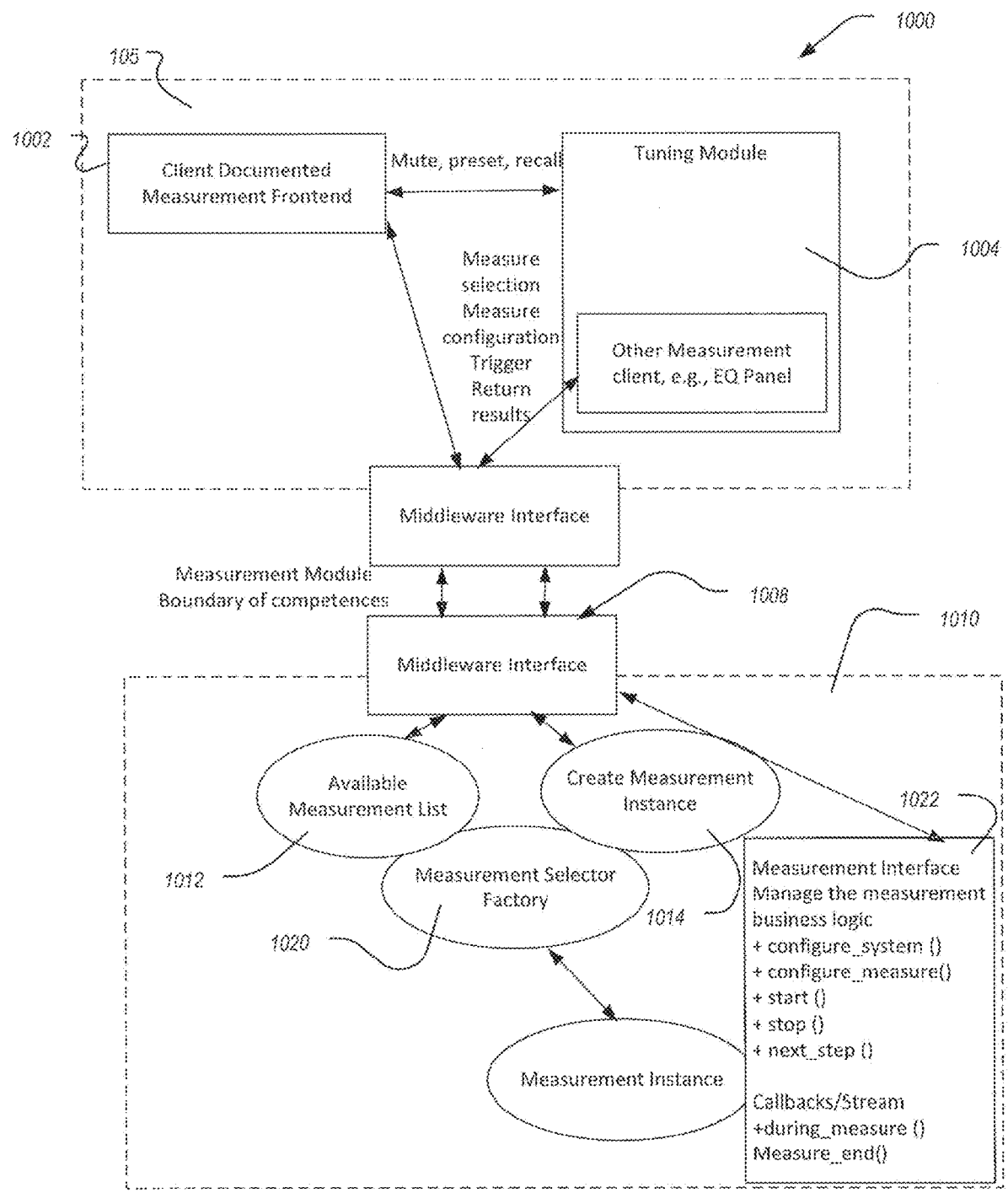
FIG. 10 illustrates an example flow chart for a process of a measurement routine.

FIG. 10 illustrates an example flow chart for a process 1000 of a measurement routine. The measurement routine may be part of the measurement data procurement discussed at block 712 with respect to FIG. 7. As explained, this measurement data may be used by the user to make adjustments to the tuning, devices, algorithms used, etc. The measurement data may be directly communicated to the target device for simple and efficient automation of various range of audio measurement routines. The measurement data may be accessed on the same PC or via the network. The connection may be made via Asio or MME sound card, among others.

The process 1000 may include a client measurement block 1002 and a tuning block 1004. The client measurement block 1002 may include a frontend measurement provided by the client. The tuning block 1004 may include other measurements such as those from the EQ panel, etc. The client measurement block 1002 and the tuning block 1004 may communication with each other. The tuning block 1004 may send and receive presents, recalls, etc. Measurement selection, trigger events, measurement configurations, results, etc., may also be transmitted between the client measurement block 1002 and the tuning block 1004.

The process 1000 may include a middleware interface 1008 configured to communicate with the backend 1010. The measurement results, presets, etc., may be transmitted from the GTT 105 to the backend 1010. The backend 1010 may be processing performed by the processor 110. For example, the available measurement list 1012 and a created measurement instance 1014, which may be initiated by the user, may be combined to select a measurement at block 1020. The measurement interface 1022 may present the measurement results to the user.

Figure 11:
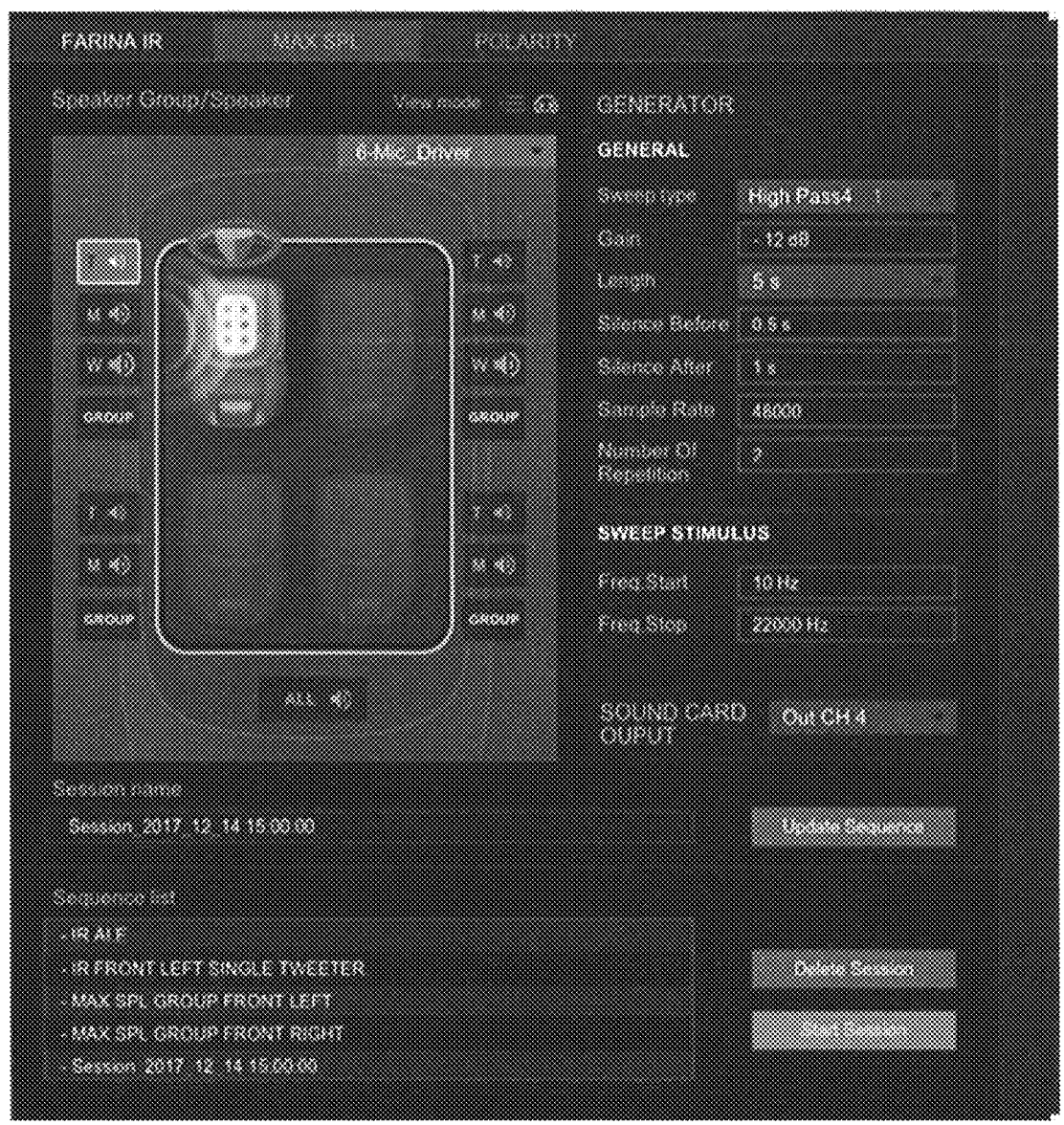
FIG. 11 illustrates an example measurement panel.

FIG. 11 illustrates an example measurement panel 1102. The measurement panel 1102 in FIG. 11 illustrates an example panel for an automotive audio measurement having six microphones. Measurements may be automated by directly controlling the parameters of audio object sin the pipeline and along the signal flow.

Figure 12:
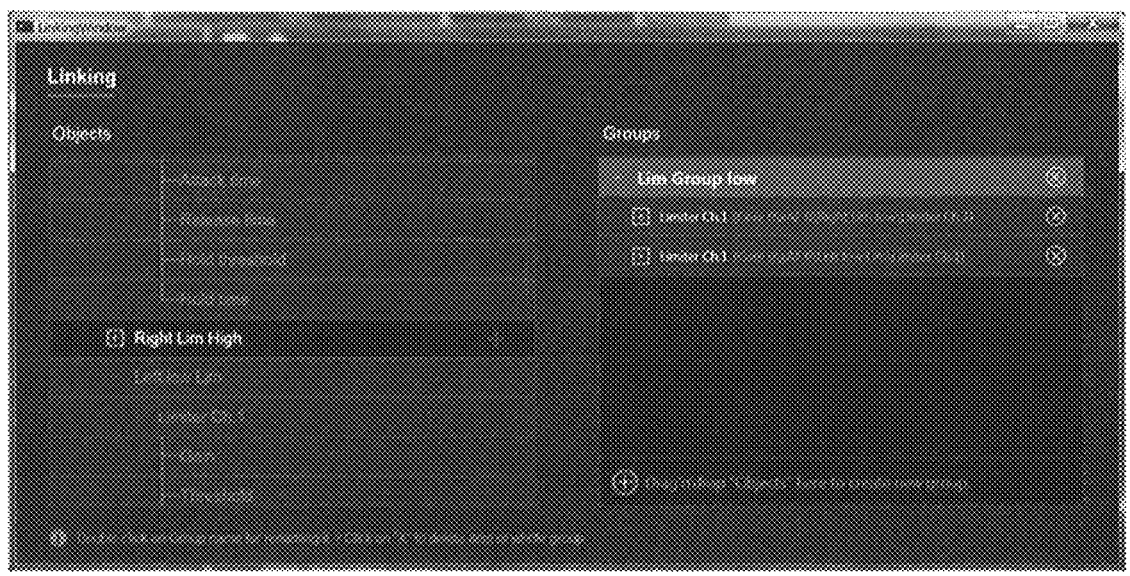
FIG. 12 illustrates an example linking panel.

FIG. 12 illustrates an example linking panel 1202. The linking panel may allow for state variables with intuitive UX/UI concepts to be linked.

Accordingly, interoperability of audio functions in complex systems may be facilitated via the above described system. This smart, seamless and intuitive solution allows for the possibility to easily configure the audio algorithm database and DSP framework, as well as to tune and control the various algorithms. High quality audio products with the highest degree of flexibility and efficiently on the market may be created via this system. The system allows for rapid design, quick prototyping on diverse hardware and ensures fast time to market.

The system may be tailored to third-party demands and enable a wide range of business models. HaloSonic allows for integration of sound management including third party solutions. This may include exhaust sound generation, exhaust cancellation, active noise vibration mounts algorithms and generic key tuning tool functions. NVH and audio flows smoothly work together to maximize the performance for each domain.

Any hardware, anywhere may be quickly adapted and optimized due to the hardware and operating system (OS) abstraction layer. The system may be run on head units or amplifiers, as well as legacy hardware to powerful processors in smartphones. The tool may be run on a PC, smartphone or tablet and may support multi instances, multi cores, multi processors, multi devices, all running with one single GTT instance.

All algorithms and objects may use standardized interfaces and be managed by a certification process to ensure consistent quality and interoperability. Third party algorithms may be easily integrated. The certification processes ensure that third party algorithms comply with pre-defined/tailored quality standards.

Completed sound tuning may be performed virtually based on Multiphysics simulation, virtual acoustics, auralization, and the virtual amplifier solution. This enables a sound tuning at a very early stage of the development cycle where the physical product and/or amplifier does not exist yet.

The system enables rapid proto-typing with live profiling for processor MIPS and memory. New designs may be tested, demoed, and benchmarked very early in the project development phase.

Computing devices described herein generally include computer-executable instructions, where the instructions may be executable by one or more computing or hardware devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An audio processing system comprising:
at least one memory configured to maintain a plurality of audio signal processing algorithms and audio components; and
a server having a processor configured to:
present an interface displaying at least a portion of the signal processing algorithms and audio components;
present an option for generating customized interfaces via the interface;
receive user selection of at least two windows corresponding to the audio signal algorithms and audio components;
present a customized panel including the user selection;
receive user selection of at least one of the audio components displayed in the customized panel;
present the at least one selected audio component via the interface for displaying targeted parameters of the selected audio component;
receive user selection of at least one of signal processing algorithms to apply to the at least one selected audio component;
apply the at least one selected algorithm to the at least one selected audio component; and
provide a measurement of the at least one selected algorithm and the at least one selected audio component via the interface,
generate an audio system framework based on the at least one selected audio components and present a visual representation of at least a portion of the audio system framework via the interface; and
receive a selection of a plurality of target devices and apply the audio system framework to the selected target devices simultaneously, where the target devices include devices of various types of devices and the measurements are specific to each device.

2. The system of claim 1, wherein the at least one selected audio processing algorithm includes a virtual amplifier.

3. The system of claim 1, wherein the at least one audio processing algorithm includes a tuning protocol for tuning the audio components.

4. The system of claim 1, wherein the processor is further configured to receive a signal flow selection indicating a flow of the signal through the at least one selected audio component.

5. The system of claim 1, wherein the processor is further configured to authenticate a user prior to receiving user selections and presenting the interface.

6. The system of claim 1, wherein the processor is further configured to simulate an audio output based on the measurement of the at least one selected algorithm and the at least one selected audio component and present the simulated output via the interface.

7. The system of claim 1, wherein the plurality of audio signal processing algorithms and audio components are associated with at least an individual sound zone (ISZ).

8. The system of claim 7, wherein the processor is further configured to receive user selection for the at least ISZ which corresponds to at least one of a primary audio source mix and a secondary audio source mix for the at least ISZ.

9. The system of claim 8, wherein the processor is further configured to adjust the at least one primary audio source mix and the secondary audio source mix at left and right channels based on the user selection.

10. The system of claim 7, wherein the processor is further configured to assign the primary audio source mix to one or more separate audio channels for the at least ISZ based on the user selection.

11. A method for an audio processing system, comprising:
presenting an interface displaying a plurality of signal processing algorithms and audio components;
presenting an option for generating customized interfaces via the interface;
receiving user selection of at least two windows corresponding to the audio signal algorithms and audio components;
presenting a customized panel including the user selection;
receiving user selection of at least one of the audio components displayed in the customized panel;
presenting the at least one selected audio component via the interface for displaying targeted parameters of the selected audio component;
receiving user selection of at least one of signal processing algorithms to apply to the at least one selected audio component;
applying the at least one selected algorithm to the at least one selected audio component;
providing a measurement of the at least one selected algorithm and the at least one selected audio component via the interface;
generating an audio system framework based on the at least one selected audio components and presenting a visual representation of at least a portion of the audio system framework via the interface; and
receiving a selection of a plurality of target devices and apply the audio system framework to the selected target devices simultaneously, where the target devices include devices of various types of devices and the measurements are specific to each device.

12. The method of claim 11, wherein at least one of the audio processing algorithms includes a virtual amplifier.

13. The method of claim 11, wherein the at least one of the audio processing algorithms includes a tuning protocol for tuning the audio components.

14. The method of claim 11, receiving a signal flow selection indicating the flow of the signal through the at least one selected audio component.

15. The method of claim 11, authenticating a user prior to receiving user selections and presenting the interface.

16. The method of claim 11, simulating an audio output based on the measurement of the at least one selected algorithm and the at least one selected audio component and presenting the simulated output via the interface.

* * * * *